(12) United States Patent
Shkedi

(10) Patent No.: US 11,610,226 B2
(45) Date of Patent: *Mar. 21, 2023

(54) CONDITION-BASED METHOD OF DIRECTING ELECTRONIC PROFILE-BASED ADVERTISEMENTS FOR DISPLAY IN AD SPACE IN VIDEO STREAMS

(71) Applicant: AlmondNet, Inc., Long Island City, NY (US)

(72) Inventor: Roy Shkedi, Forest Hills, NY (US)

(73) Assignee: AlmondNet, Inc., Long Island City, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,936

(22) Filed: Apr. 6, 2022

(65) Prior Publication Data

US 2022/0335472 A1 Oct. 20, 2022

Related U.S. Application Data

(63) Continuation of application No. 17/097,865, filed on Nov. 13, 2020, now Pat. No. 11,301,898, which is a
(Continued)

(51) Int. Cl.
*G06Q 30/02* (2012.01)
*H04L 67/50* (2022.01)
(Continued)

(52) U.S. Cl.
CPC ......... *G06Q 30/0255* (2013.01); *G06Q 30/02* (2013.01); *G06Q 30/0241* (2013.01);
(Continued)

(58) Field of Classification Search
CPC .............. G06Q 30/02; G06Q 30/0241; G06Q 30/0242; G06Q 30/0246; G06Q 30/0247;
(Continued)

(56) References Cited

U.S. PATENT DOCUMENTS

| 5,220,655 A | 6/1993 | Tsutsui |
| 5,359,508 A | 10/1994 | Rossides |

(Continued)

FOREIGN PATENT DOCUMENTS

| CA | 2246746 | 3/1998 |
| JP | 2003-331183 | 11/2003 |

(Continued)

OTHER PUBLICATIONS

Excerpts from Michael Miller, Building Really Annoying Websites (2001) (pp. IX-XX, 97-127).

(Continued)

*Primary Examiner* — Kostas J Katsikis
(74) *Attorney, Agent, or Firm* — Louis J. Hoffman; David S. Alavi

(57) ABSTRACT

An automatic system facilitates selection of media properties on which to display an advertisement, responsive to a profile collected on a first media property, where a behavioral-targeting company calculates expected profit for an ad correlated with the profile and arranges for the visitor to be tagged with a tag readable by the selected media property. The profit can be calculated by deducting, from the revenues that are expected to be generated from an ad delivered based on the collected profile, at least the price of ad space at a media property where the BT company might like to deliver ads to the profiled visitor. When the calculated profit is positive (i.e., not a loss), the BT company arranges for the visitor to be tagged with a tag readable by the selected media property through which the BT company expects to profit.

36 Claims, 3 Drawing Sheets

Related U.S. Application Data continuation of application No. 16/678,196, filed on Nov. 8, 2019, now Pat. No. 10,839,423, which is a continuation of application No. 16/194,203, filed on Nov. 16, 2018, now Pat. No. 10,475,073, which is a continuation of application No. 15/822,974, filed on Nov. 27, 2017, now Pat. No. 10,134,054, which is a continuation of application No. 15/360,762, filed on Nov. 23, 2016, now Pat. No. 9,830,615, which is a continuation of application No. 14/960,237, filed on Dec. 4, 2015, now Pat. No. 9,508,089, which is a continuation of application No. 14/620,502, filed on Feb. 12, 2015, now Pat. No. 9,208,514, which is a continuation of application No. 14/201,494, filed on Mar. 7, 2014, now Pat. No. 8,959,146, which is a continuation of application No. 13/491,454, filed on Jun. 7, 2012, now Pat. No. 8,671,139, which is a continuation of application No. 12/823,709, filed on Jun. 25, 2010, now Pat. No. 8,204,783, which is a continuation of application No. 11/763,286, filed on Jun. 14, 2007, now Pat. No. 7,747,745.

(60) Provisional application No. 60/805,119, filed on Jun. 19, 2006, provisional application No. 60/804,937, filed on Jun. 16, 2006.

(51) Int. Cl.
*H04L 67/306* (2022.01)
*G06Q 30/0251* (2023.01)
*G06Q 30/0241* (2023.01)
*G06Q 30/0242* (2023.01)
*G06Q 30/0273* (2023.01)

(52) U.S. Cl.
CPC ..... *G06Q 30/0242* (2013.01); *G06Q 30/0246* (2013.01); *G06Q 30/0247* (2013.01); *G06Q 30/0249* (2013.01); *G06Q 30/0269* (2013.01); *G06Q 30/0273* (2013.01); *G06Q 30/0277* (2013.01); *H04L 67/306* (2013.01); *H04L 67/535* (2022.05)

(58) Field of Classification Search
CPC .......... G06Q 30/0249; G06Q 30/0255; G06Q 30/0269; G06Q 30/0273; G06Q 30/0277; H04L 67/22; H04L 67/306
See application file for complete search history.

(56) References Cited

U.S. PATENT DOCUMENTS

| | | | |
|---|---|---|---|
| 5,442,633 A | 8/1995 | Perkins et al. |
| 5,572,643 A | 11/1996 | Judson |
| 5,636,346 A | 6/1997 | Saxe |
| 5,710,884 A | 1/1998 | Dedrick |
| 5,717,923 A | 2/1998 | Dedrick |
| 5,724,424 A | 3/1998 | Gifford |
| 5,724,521 A | 3/1998 | Dedrick |
| 5,751,956 A | 5/1998 | Kirsch |
| 5,752,238 A | 5/1998 | Dedrick |
| 5,774,670 A | 6/1998 | Montulli |
| 5,794,210 A | 8/1998 | Goldhaber et al. |
| 5,819,092 A | 10/1998 | Ferguson et al. |
| 5,819,285 A | 10/1998 | Damico et al. |
| 5,835,718 A | 11/1998 | Blewett |
| 5,835,896 A | 11/1998 | Fisher et al. |
| 5,848,396 A | 12/1998 | Gerace |
| 5,855,008 A | 12/1998 | Goldhaber et al. |
| 5,870,546 A | 2/1999 | Kirsch |
| 5,870,550 A | 2/1999 | Wesinger, Jr. et al. |
| 5,901,287 A | 5/1999 | Bull et al. |
| 5,918,014 A | 6/1999 | Robinson |
| 5,933,811 A | 8/1999 | Angles et al. |
| 5,937,390 A | 8/1999 | Hyodo |
| 5,937,392 A | 8/1999 | Alberts |
| 5,948,061 A | 9/1999 | Merriman et al. |
| 5,959,623 A | 9/1999 | van Hoff et al. |
| 5,963,915 A | 10/1999 | Kirsch |
| 5,999,912 A | 12/1999 | Wodarz et al. |
| 6,014,638 A | 1/2000 | Burge et al. |
| 6,016,504 A | 1/2000 | Arnold et al. |
| 6,026,368 A | 2/2000 | Brown et al. |
| 6,026,369 A | 2/2000 | Capek |
| 6,026,374 A | 2/2000 | Chess |
| 6,034,689 A | 3/2000 | White et al. |
| 6,044,376 A | 3/2000 | Kurtzman, II |
| 6,047,310 A | 4/2000 | Kamakura et al. |
| 6,049,835 A | 4/2000 | Gagnon |
| 6,055,513 A | 4/2000 | Katz et al. |
| 6,073,241 A | 6/2000 | Rosenberg et al. |
| 6,128,663 A | 10/2000 | Thomas |
| 6,133,912 A | 10/2000 | Montero |
| 6,134,532 A | 10/2000 | Lazarus et al. |
| 6,141,010 A | 10/2000 | Hoyle |
| 6,177,931 B1 | 1/2001 | Alexander et al. |
| 6,188,398 B1 | 2/2001 | Collins-Rector et al. |
| 6,205,432 B1 | 3/2001 | Gabbard et al. |
| 6,216,112 B1 | 4/2001 | Fuller et al. |
| 6,216,129 B1 | 4/2001 | Eldering |
| 6,269,361 B1 | 7/2001 | Davis et al. |
| 6,285,987 B1 | 9/2001 | Roth |
| 6,285,991 B1 | 9/2001 | Powar |
| 6,289,318 B1 | 9/2001 | Barber |
| 6,308,202 B1 | 10/2001 | Cohn et al. |
| 6,324,519 B1 | 11/2001 | Eldering |
| 6,366,298 B1 | 4/2002 | Haitsuka et al. |
| 6,377,986 B1 | 4/2002 | Philyaw et al. |
| 6,385,592 B1 | 5/2002 | Angles et al. |
| 6,401,075 B1 | 6/2002 | Mason et al. |
| 6,408,278 B1 | 6/2002 | Carney et al. |
| 6,415,270 B1 | 7/2002 | Rackson et al. |
| 6,415,322 B1 | 7/2002 | Jaye |
| 6,449,657 B2 | 9/2002 | Stanbach, Jr. et al. |
| 6,484,492 B2 | 11/2002 | Meholic et al. |
| 6,487,538 B1 | 11/2002 | Gupta et al. |
| 6,490,601 B1 | 12/2002 | Markus et al. |
| 6,505,169 B1 | 1/2003 | Bhagavath et al. |
| 6,523,041 B1 | 2/2003 | Morgan et al. |
| 6,584,505 B1 | 6/2003 | Howard et al. |
| 6,615,247 B1 | 9/2003 | Murphy |
| 6,633,850 B1 | 10/2003 | Gabbard et al. |
| 6,654,725 B1 | 11/2003 | Langheinrich et al. |
| 6,766,327 B2 | 7/2004 | Morgan et al. |
| 6,804,659 B1 | 10/2004 | Graham et al. |
| 6,810,527 B1 | 10/2004 | Conrad et al. |
| 6,832,207 B1 | 12/2004 | Shkedi |
| 6,850,988 B1 | 2/2005 | Reed |
| 6,868,392 B1 | 3/2005 | Ogasawara |
| 6,868,525 B1 | 3/2005 | Szabo |
| 6,895,387 B1 | 5/2005 | Roberts et al. |
| 6,907,566 B1 | 6/2005 | McElfresh et al. |
| 6,915,271 B1 | 7/2005 | Meyer et al. |
| 6,925,440 B1 | 8/2005 | Shkedi |
| 6,973,436 B1 | 12/2005 | Shkedi |
| 6,983,379 B1 | 1/2006 | Spalink et al. |
| 6,985,882 B1 | 1/2006 | Del Sesto |
| 7,007,074 B2 | 2/2006 | Radwin |
| 7,038,637 B1 | 5/2006 | Eller et al. |
| 7,039,594 B1 | 5/2006 | Gersting |
| 7,039,599 B2 | 5/2006 | Merriman et al. |
| 7,039,699 B1 | 5/2006 | Narin et al. |
| 7,043,531 B1 | 5/2006 | Seibel et al. |
| 7,058,593 B1 | 6/2006 | Merritt |
| 7,065,550 B2 | 6/2006 | Raghunandan |
| 7,072,853 B2 | 7/2006 | Shkedi |
| 7,085,682 B1 | 8/2006 | Heller et al. |
| 7,155,508 B2 | 12/2006 | Sankuratripati et al. |
| 7,165,105 B2 | 1/2007 | Reiner et al. |
| 7,181,438 B1 | 2/2007 | Szabo |
| 7,188,076 B2 | 3/2007 | Bensemana |

(56) References Cited

U.S. PATENT DOCUMENTS

| | | |
|---|---|---|
| 7,194,424 B2 | 3/2007 | Greer et al. |
| 7,246,150 B1 | 7/2007 | Donoho et al. |
| 7,251,628 B1 | 7/2007 | Edlund et al. |
| 7,299,195 B1 | 11/2007 | Tawakol et al. |
| 7,337,133 B1 | 2/2008 | Bezos et al. |
| 7,360,251 B2 | 4/2008 | Spalink et al. |
| 7,386,599 B1 | 6/2008 | Piersol et al. |
| 7,428,493 B2 | 9/2008 | Shkedi |
| 7,454,364 B2 | 11/2008 | Shkedi |
| 7,530,020 B2 | 5/2009 | Szabo |
| 7,552,069 B2 | 6/2009 | Kepecs |
| 7,558,795 B2 | 7/2009 | Malik et al. |
| 7,567,958 B1 | 7/2009 | Alspector et al. |
| 7,580,855 B2 | 8/2009 | Fernandes |
| 7,606,810 B1 | 10/2009 | Jeavons |
| 7,698,422 B2 | 4/2010 | Vanderhook et al. |
| 7,739,594 B2 | 6/2010 | Vasilik |
| 7,756,744 B2 | 7/2010 | Schiff et al. |
| 7,797,274 B2 | 9/2010 | Strathearn et al. |
| 7,805,332 B2 | 9/2010 | Wilson |
| 7,822,636 B1 | 10/2010 | Ferber et al. |
| 7,822,637 B2 | 10/2010 | Shkedi |
| 7,822,639 B2 | 10/2010 | Shkedi |
| 7,843,923 B2 | 11/2010 | Baum |
| 7,861,260 B2 | 12/2010 | Shkedi |
| 7,890,609 B2 | 2/2011 | Shkedi |
| 7,894,448 B1 | 2/2011 | Lillibridge et al. |
| 7,899,801 B1 | 3/2011 | Bronson et al. |
| 7,899,862 B2 | 3/2011 | Appelman et al. |
| 7,930,252 B2 | 4/2011 | Bender et al. |
| 7,949,553 B1 | 5/2011 | Wisniewski et al. |
| 7,958,224 B2 | 6/2011 | Amjadi |
| 7,979,307 B2 | 7/2011 | Shkedi |
| 8,015,184 B2 | 9/2011 | Zito et al. |
| 8,019,881 B2 | 9/2011 | Sandhu et al. |
| 8,036,929 B1 | 10/2011 | Reisman |
| 8,040,819 B2 | 10/2011 | Harrington et al. |
| 8,050,970 B2 | 11/2011 | Barry et al. |
| 8,051,444 B2 | 11/2011 | Shkedi |
| 8,082,332 B2 | 12/2011 | Gilbert |
| 8,095,450 B2 | 1/2012 | Walker et al. |
| 8,117,068 B2 | 2/2012 | Shuster et al. |
| 8,131,271 B2 | 3/2012 | Ramer et al. |
| 8,135,799 B2 | 3/2012 | Mekikian |
| 8,175,908 B1 | 5/2012 | Anderson |
| 8,239,264 B2 | 8/2012 | Shkedi |
| 8,244,574 B2 | 8/2012 | Shkedi |
| 8,244,582 B2 | 8/2012 | Shkedi |
| 8,244,583 B2 | 8/2012 | Shkedi |
| 8,244,586 B2 | 8/2012 | Shkedi |
| 8,280,758 B2 | 10/2012 | Shkedi |
| 8,281,336 B2 | 10/2012 | Shkedi |
| 8,364,540 B2 | 1/2013 | Soroca et al. |
| 8,494,904 B2 | 7/2013 | Shkedi |
| 8,510,174 B2 | 8/2013 | Walker et al. |
| 8,527,352 B2 | 9/2013 | Chatwin et al. |
| 8,554,940 B2 | 10/2013 | Jennings et al. |
| 8,566,164 B2 | 10/2013 | Shkedi et al. |
| 8,589,210 B2 | 11/2013 | Shkedi |
| 8,595,069 B2 | 11/2013 | Shkedi et al. |
| 8,600,815 B2 | 12/2013 | Shkedi |
| 8,607,267 B2 | 12/2013 | Shkedi |
| 8,677,398 B2 | 3/2014 | Shkedi |
| 8,683,502 B2 | 3/2014 | Shkedi et al. |
| 8,695,032 B2 | 4/2014 | Shkedi |
| 8,713,600 B2 | 4/2014 | Shkedi |
| 8,751,310 B2 | 6/2014 | van Datta et al. |
| 8,768,766 B2 | 7/2014 | Ellis et al. |
| 8,775,249 B2 | 7/2014 | Shkedi |
| 8,880,677 B2 | 11/2014 | Julia et al. |
| 8,930,204 B1 | 1/2015 | Igoe et al. |
| 8,996,406 B2 | 3/2015 | Jain |
| 8,997,138 B2 | 3/2015 | Shkedi |
| 9,071,886 B2 | 6/2015 | Shkedi |
| 9,078,035 B2 | 7/2015 | Shkedi et al. |
| 9,083,853 B2 | 7/2015 | Shkedi |
| 9,110,903 B2 | 8/2015 | Martinez et al. |
| 9,117,217 B2 | 8/2015 | Wilson et al. |
| 9,131,282 B2 | 9/2015 | Shkedi |
| 9,226,019 B2 | 12/2015 | Shkedi |
| 9,271,024 B2 | 2/2016 | Shkedi et al. |
| 9,351,053 B2 | 5/2016 | Shkedi |
| 9,369,779 B2 | 6/2016 | Shkedi |
| 9,571,865 B2 | 2/2017 | Shkedi |
| 9,591,380 B2 | 3/2017 | Shkedi et al. |
| 9,756,372 B2 | 9/2017 | Shkedi |
| 9,800,917 B2 | 10/2017 | Shkedi |
| 9,813,778 B2 | 11/2017 | Shkedi |
| 10,009,636 B2 | 6/2018 | Shkedi |
| 10,026,100 B2 | 7/2018 | Shkedi |
| 10,070,200 B2 | 9/2018 | Shkedi |
| 10,178,442 B2 | 1/2019 | Shkedi |
| 10,306,282 B2 | 5/2019 | Shkedi |
| 10,321,198 B2 | 6/2019 | Shkedi et al. |
| 10,405,058 B2 | 9/2019 | Shkedi et al. |
| 10,628,857 B2 | 4/2020 | Shkedi |
| 10,645,438 B2 | 5/2020 | Shkedi |
| 10,715,878 B2 | 7/2020 | Shkedi |
| 10,771,860 B2 | 9/2020 | Shkedi et al. |
| 10,839,423 B2 | 11/2020 | Shkedi |
| 10,984,445 B2 | 4/2021 | Shkedi |
| 11,082,753 B2 | 4/2021 | Shkedi et al. |
| 11,093,970 B2 | 8/2021 | Shkedi |
| 11,095,952 B2 | 8/2021 | Shkedi et al. |
| 11,282,105 B1 | 3/2022 | Shkedi et al. |
| 11,301,898 B2 | 4/2022 | Shkedi |
| 11,303,973 B2 | 4/2022 | Shkedi |
| 11,368,763 B2 | 6/2022 | Shkedi et al. |
| 2001/0014868 A1 | 8/2001 | Herz et al. |
| 2001/0020242 A1 | 9/2001 | Gupta et al. |
| 2001/0034637 A1 | 10/2001 | Lin et al. |
| 2001/0034646 A1 | 10/2001 | Hoyt et al. |
| 2001/0039515 A1 | 11/2001 | Mayadas |
| 2001/0042002 A1 | 11/2001 | Koopersmitch |
| 2001/0044743 A1 | 11/2001 | McKinley et al. |
| 2002/0002541 A1 | 1/2002 | Williams |
| 2002/0026360 A1 | 2/2002 | McGregor et al. |
| 2002/0038350 A1 | 3/2002 | Lambert et al. |
| 2002/0046286 A1 | 4/2002 | Caldwell et al. |
| 2002/0072965 A1 | 6/2002 | Merriman et al. |
| 2002/0072971 A1 | 6/2002 | DeBusk et al. |
| 2002/0077891 A1 | 6/2002 | Castle et al. |
| 2002/0082910 A1 | 6/2002 | Kontogouris |
| 2002/0082923 A1 | 6/2002 | Merriman et al. |
| 2002/0091568 A1 | 7/2002 | Kraft et al. |
| 2002/0099603 A1 | 7/2002 | Bandura |
| 2002/0112013 A1 | 8/2002 | Walsh |
| 2002/0112171 A1 | 8/2002 | Ginter et al. |
| 2002/0116313 A1 | 8/2002 | Detering |
| 2002/0123928 A1 | 9/2002 | Eldering et al. |
| 2002/0133399 A1 | 9/2002 | Main |
| 2002/0143632 A1 | 10/2002 | Walter et al. |
| 2002/0161633 A1 | 10/2002 | Jacob et al. |
| 2002/0161636 A1 | 10/2002 | Takahashi et al. |
| 2002/0184088 A1 | 12/2002 | Rosenberg |
| 2002/0194058 A1 | 12/2002 | Eldering |
| 2003/0014304 A1 | 1/2003 | Calvert et al. |
| 2003/0023481 A1 | 1/2003 | Calvert et al. |
| 2003/0028451 A1 | 2/2003 | Ananian |
| 2003/0036944 A1 | 2/2003 | Lesandrini et al. |
| 2003/0046156 A1 | 3/2003 | Cromer et al. |
| 2003/0046689 A1 | 3/2003 | Gaos |
| 2003/0050827 A1 | 3/2003 | Hennessey |
| 2003/0050863 A1 | 3/2003 | Radwin |
| 2003/0065558 A1 | 4/2003 | Shaw et al. |
| 2003/0065805 A1 | 4/2003 | Barnes, Jr. |
| 2003/0083931 A1 | 5/2003 | Lang |
| 2003/0083938 A1 | 5/2003 | Smith et al. |
| 2003/0101126 A1 | 5/2003 | Cheung et al. |
| 2003/0110497 A1 | 6/2003 | Yassin et al. |
| 2003/0135413 A1 | 7/2003 | Nishi et al. |
| 2003/0135460 A1 | 7/2003 | Talegon |
| 2003/0135853 A1 | 7/2003 | Goldman et al. |
| 2003/0149621 A1 | 8/2003 | Shteyn |

(56) References Cited

U.S. PATENT DOCUMENTS

| | | |
|---|---|---|
| 2003/0149938 A1 | 8/2003 | McElfresh et al. |
| 2003/0154126 A1 | 8/2003 | Gehlot et al. |
| 2003/0171990 A1 | 9/2003 | Rao et al. |
| 2003/0208404 A1 | 11/2003 | Michie |
| 2003/0220837 A1 | 11/2003 | Asayama |
| 2003/0229542 A1 | 12/2003 | Morrisroe |
| 2004/0024632 A1 | 2/2004 | Perry |
| 2004/0044566 A1 | 3/2004 | Bostelmann et al. |
| 2004/0059632 A1 | 3/2004 | Kang et al. |
| 2004/0068436 A1 | 4/2004 | Boubek et al. |
| 2004/0068477 A1 | 4/2004 | Gilmour et al. |
| 2004/0107287 A1 | 6/2004 | Ananda et al. |
| 2004/0117248 A1 | 6/2004 | Dutta et al. |
| 2004/0117322 A1 | 6/2004 | Bjorksten et al. |
| 2004/0147265 A1 | 7/2004 | Kelley et al. |
| 2004/0176995 A1 | 9/2004 | Fusz |
| 2004/0186776 A1 | 9/2004 | Llach |
| 2004/0193488 A1 | 9/2004 | Khoo et al. |
| 2004/0215515 A1 | 10/2004 | Perry |
| 2004/0260605 A1 | 12/2004 | McIntyre et al. |
| 2005/0010472 A1 | 1/2005 | Quatse et al. |
| 2005/0021397 A1 | 1/2005 | Cui et al. |
| 2005/0028188 A1 | 2/2005 | Latona et al. |
| 2005/0038698 A1 | 2/2005 | Lukose et al. |
| 2005/0038702 A1 | 2/2005 | Merriman et al. |
| 2005/0080772 A1 | 4/2005 | Bem |
| 2005/0086109 A1 | 4/2005 | McFadden et al. |
| 2005/0086112 A1 | 4/2005 | Shkedi |
| 2005/0120045 A1 | 6/2005 | Klawon |
| 2005/0120091 A1 | 6/2005 | Casais |
| 2005/0131762 A1 | 6/2005 | Bharat et al. |
| 2005/0165644 A1 | 7/2005 | Beyda et al. |
| 2005/0166233 A1 | 7/2005 | Beyda et al. |
| 2005/0177401 A1 | 8/2005 | Koeppel et al. |
| 2005/0177613 A1 | 8/2005 | Dresden |
| 2005/0187818 A1 | 8/2005 | Zito et al. |
| 2005/0192863 A1 | 9/2005 | Mohan |
| 2005/0216336 A1 | 9/2005 | Roberts et al. |
| 2005/0216823 A1 | 9/2005 | Petersen et al. |
| 2005/0222905 A1 | 10/2005 | Wills |
| 2005/0278443 A1 | 12/2005 | Winner et al. |
| 2005/0289590 A1 | 12/2005 | Cheok et al. |
| 2006/0020508 A1 | 1/2006 | Gorti et al. |
| 2006/0020510 A1 | 1/2006 | Vest |
| 2006/0026061 A1 | 2/2006 | Collins |
| 2006/0026064 A1 | 2/2006 | Collins |
| 2006/0029296 A1 | 2/2006 | King et al. |
| 2006/0053047 A1 | 3/2006 | Garcia et al. |
| 2006/0064351 A1 | 3/2006 | Hamor et al. |
| 2006/0069614 A1 | 3/2006 | Agarwal et al. |
| 2006/0069616 A1 | 3/2006 | Bau |
| 2006/0095322 A1 | 5/2006 | Dierks |
| 2006/0098899 A1 | 5/2006 | King et al. |
| 2006/0106710 A1 | 5/2006 | Meek et al. |
| 2006/0116924 A1 | 6/2006 | Angles et al. |
| 2006/0122879 A1 | 6/2006 | O'Kelley |
| 2006/0129455 A1 | 6/2006 | Shah |
| 2006/0161553 A1 | 7/2006 | Woo |
| 2006/0183467 A1 | 8/2006 | Stewart |
| 2006/0200377 A1 | 9/2006 | Wolfe et al. |
| 2006/0212349 A1 | 9/2006 | Brady |
| 2006/0212350 A1 | 9/2006 | Ellis et al. |
| 2006/0224496 A1 | 10/2006 | Sandholm et al. |
| 2006/0253432 A1 | 11/2006 | Eagle et al. |
| 2006/0271690 A1 | 11/2006 | Banga et al. |
| 2006/0282327 A1 | 12/2006 | Neal et al. |
| 2006/0287916 A1 | 12/2006 | Starr et al. |
| 2007/0027850 A1 | 2/2007 | Chan et al. |
| 2007/0027901 A1 | 2/2007 | Chan et al. |
| 2007/0038516 A1 | 2/2007 | Apple et al. |
| 2007/0061331 A1 | 3/2007 | Ramer et al. |
| 2007/0067297 A1 | 3/2007 | Kublickis |
| 2007/0079331 A1 | 4/2007 | van Datta et al. |
| 2007/0088603 A1 | 4/2007 | Jouppi et al. |
| 2007/0100796 A1 | 5/2007 | Wang |
| 2007/0121843 A1 | 5/2007 | Atazky et al. |
| 2007/0130015 A1 | 6/2007 | Starr et al. |
| 2007/0130070 A1 | 6/2007 | Williams |
| 2007/0150234 A1 | 6/2007 | Wicks |
| 2007/0150457 A1 | 6/2007 | Goldman et al. |
| 2007/0150468 A1 | 6/2007 | Goldman et al. |
| 2007/0150483 A1 | 6/2007 | Goldman et al. |
| 2007/0150721 A1 | 6/2007 | Goldman et al. |
| 2007/0157228 A1 | 7/2007 | Bayer et al. |
| 2007/0157245 A1 | 7/2007 | Collins |
| 2007/0157247 A1 | 7/2007 | Cordray et al. |
| 2007/0162396 A1 | 7/2007 | Goldman et al. |
| 2007/0179845 A1 | 8/2007 | Jain |
| 2007/0179846 A1 | 8/2007 | Jain et al. |
| 2007/0179848 A1 | 8/2007 | Jain |
| 2007/0179849 A1 | 8/2007 | Jain |
| 2007/0179853 A1 | 8/2007 | Feige et al. |
| 2007/0192166 A1 | 8/2007 | Van Luchene |
| 2007/0192168 A1 | 8/2007 | Van Luchene |
| 2007/0198385 A1 | 8/2007 | McGill et al. |
| 2007/0203794 A1 | 8/2007 | Hajdukiewicz et al. |
| 2007/0214037 A1 | 9/2007 | Shubert et al. |
| 2007/0214048 A1 | 9/2007 | Chan et al. |
| 2007/0239517 A1 | 10/2007 | Chung et al. |
| 2007/0239518 A1 | 10/2007 | Chung et al. |
| 2007/0260514 A1 | 11/2007 | Burdick et al. |
| 2007/0260624 A1 | 11/2007 | Chung et al. |
| 2007/0265910 A1 | 11/2007 | Varghese |
| 2007/0288304 A1* | 12/2007 | Gutierrez ............ G06Q 30/0202 705/7.31 |
| 2008/0052392 A1 | 2/2008 | Webster et al. |
| 2008/0109306 A1 | 5/2008 | Maigret et al. |
| 2008/0120178 A1 | 5/2008 | Martinez et al. |
| 2008/0262901 A1 | 10/2008 | Banga et al. |
| 2008/0263633 A1 | 10/2008 | Banga et al. |
| 2008/0319850 A1 | 12/2008 | Shaul et al. |
| 2009/0049468 A1 | 2/2009 | Shkedi |
| 2009/0106100 A1 | 4/2009 | Mashinsky |
| 2009/0119151 A1 | 5/2009 | de Heer |
| 2009/0172723 A1 | 7/2009 | Shkedi et al. |
| 2009/0222329 A1 | 9/2009 | Ramer et al. |
| 2009/0234711 A1 | 9/2009 | Ramer et al. |
| 2009/0234861 A1 | 9/2009 | Ramer et al. |
| 2009/0254971 A1 | 10/2009 | Herz et al. |
| 2009/0281954 A1 | 11/2009 | Waelbroeck et al. |
| 2009/0299857 A1 | 12/2009 | Brubaker |
| 2010/0223035 A1 | 9/2010 | Weyh |
| 2010/0257053 A1 | 10/2010 | Ferber et al. |
| 2010/0268605 A1 | 10/2010 | Waelbroeck et al. |
| 2010/0293057 A1 | 11/2010 | Haveliwala et al. |
| 2010/0332583 A1 | 12/2010 | Szabo |
| 2011/0035256 A1 | 2/2011 | Shkedi et al. |
| 2011/0040607 A1 | 2/2011 | Shkedi |
| 2011/0112903 A1 | 5/2011 | Goldman et al. |
| 2011/0191140 A1 | 8/2011 | Newman et al. |
| 2011/0258049 A1 | 10/2011 | Ramer et al. |
| 2012/0209705 A1 | 8/2012 | Ramer et al. |
| 2012/0209706 A1 | 8/2012 | Ramer et al. |
| 2012/0209707 A1 | 8/2012 | Ramer et al. |
| 2012/0209708 A1 | 8/2012 | Ramer et al. |
| 2012/0209709 A1 | 8/2012 | Ramer et al. |
| 2012/0209710 A1 | 8/2012 | Ramer et al. |
| 2012/0215635 A1 | 8/2012 | Ramer et al. |
| 2012/0215639 A1 | 8/2012 | Ramer et al. |
| 2013/0097019 A1 | 4/2013 | Ferber et al. |
| 2013/0097026 A1 | 4/2013 | Ferber et al. |
| 2013/0232001 A1 | 9/2013 | van Datta et al. |
| 2013/0254035 A1 | 9/2013 | Ramer et al. |
| 2014/0324576 A1 | 10/2014 | van Datta et al. |

FOREIGN PATENT DOCUMENTS

| | | |
|---|---|---|
| JP | 2012-073990 | 4/2012 |
| KR | 10-2001-0096343 | 11/2001 |
| KR | 20020037411 | 5/2002 |
| KR | 10-2004-0099222 | 11/2004 |
| WO | WO1997021183 A1 | 6/1997 |
| WO | WO 99/44159 | 9/1999 |
| WO | WO1999057660 A1 | 11/1999 |

(56) References Cited

FOREIGN PATENT DOCUMENTS

| WO | WO 01/54034 | 7/2001 |
|---|---|---|
| WO | WO 2004/084109 | 9/2004 |
| WO | WO2005022887 A2 | 3/2005 |
| WO | WO 2005/046237 | 5/2005 |

OTHER PUBLICATIONS

Zeff & Aronson, Advertising on the Internet (2d ed. 1999); Chapters 1,4, 7, 9, 10.
Zeff & Aronson, Advertising on the Internet (1997); Chapter 8.
Tittel et al., HTML 4 for Dummies (2d ed. 1999); Introduction, Chapters 1, 6.
Miller, Michael "Building Really Annoying Websites" (2001); Chapter 5.
Dara-Abrams et al., Supporting Web Servers (2001); Chapter 8.
Fletcher et al., Practical Web Traffic Analysis: Standard, Privacy, Techniques, Results (2002); Chapters 1 and 3.
Microsoft Computer Dictionary (5th ed. 2002); pp. vii-viii, 444.
Engage Technologies, Inc., Form S-1A, filed with the Sec, pp. 36-50, Jul. 19, 1999.
The e-Marketing Report, Morgan Stanley Dean Witter, May, 2000, portions.
ClickOver, Inc. introduces ClickWise, the first intelligent, high-performance ad management system for electronic advertising, Business Wire, Mar. 24, 1997.
Advertiser Solutions, https://web.archive.org/web/20050325042542/http://www.premiumnetwork.com/advertisers.shtml, archived Mar. 25, 2005
baseview.com website (ClassManagerPro) from www.archive.org, archived Jan. 16, 1997.
Media Kit—Marketers, RevenueScience, https://web.archive.org/web/20051124105455/http://www.revenuescience.com/datafile/Mediakit_marketers_02.pdf, archived Nov. 24, 2005.
Publisher Solutions, https://web.archive.org/web/20050325061154/http://www.premiumnetwork.com/publishers.shtml, archived Mar. 25, 2005.
S-1/A SEC Filing, filed by FlyCast Communications Corporation on Apr. 30, 1999.
RevenueScience (for Publishers), Behavioral Targeting, Delivering on the Promise of One-to-One Marketing (2005).
24/7 RealMedia, The Science of Digital Marketing, Company Overview (2007).
aaddzz.com webpages from www.archive.org, archived Jan. 30, 1998.
AdForce, Inc., User Guide, A Complete Guide to AdForce, Version 2.6 (1998).
Fawcett, Adrienne W., Publishers thankful but nervous about boom, Magazinedotcom, Hot spending boosts . . . , adage.com, Nov. 1, 1999.
Ad-Star.com website archive from www.archive.org (archived on Apr. 12, 1997 and Feb. 1, 1997).
Chang et al., "Goodies" in exchange for Consumer Information on the Internet, The Economics and Issues, Proceedings of the Thirty-First Annual Hawaii International Conference on System Sciences, 1998.
avenuea.com webpage, FAQ, www.avenuea.com/corpinfo/faq.html, archived Oct. 2, 1999.
Advertising—A Unified Approach to Adverstising Management, Baseview Products, Inc. brochure, Oct. 14, 1999.
Ribeiro-Neto et al., Extracting Semi-Structured Data Through Examples, Proceedings of the Eighth international conference on Information and Knowledge Management (1999).
Raskutti and Beitz, Acquiring Customer Preferences for Information Filtering, a Heuristic-Statistical Approach, Fifth Annual Conference on User Modeling (1996).
AdKnowledge, Campaign Manager-Quick Reference Card (1996).
Emert, 2 Web Ad Firms Decide to Marry, Palo Alto's Focalink, ClickOver Merging, San Francisco Chronicle, Nov. 17, 1997.
Elderbrock & Borwankar, Building Successful Internet Businesses, IDG Worldwide (1996).
Schumann, David W. & Thorson, Ester, Advertising and the World Wide Web, Lawrence Erlbaum Associates (1999).
Williamson, Debra Aho, Web ads mark 2nd birthday with decisive issues ahead, adage.com, Oct. 21, 1996.
Williamson, Debra Aho, Targeting distinguishes AdForce from the pack, adage.com, Mar. 1, 1999.
Doubleclick.com webpages from www.archived.org, archived Feb. 5, 1998.
Tittel et al., Foundations of World Wide Web Programming with HTML & CGI, IDG Books Worldwide (1995).
Harrison et al., An Emerging Marketplace for Digital Advertising Based on Amalgamated Digital Signage Networks, IEEE International Conference on E-Commerce, Jun. 24-27, 2003.
Graham, Ian S., HTML Sourcebook, A Complete Guide to HTML, John Wiley & Sons (1995).
Aaddzz Brochure, Information Access Technologies, Inc. (1997).
Gilbert, Special Report, Agencies centralize Web ad serving, adage.com, Mar 1, 1999.
Palmer & Eriksen, Digital Newspapers Explore Marketing on the Internet, Communications of the ACM, vol. 42, No. 9, Sep. 1999.
Angwin, Julia, Focalink Will Monitor World of Online Ads, San Francisco Chronicle, Feb. 7, 1996.
Gallagher & Parsons, A Framework for Targeting Banner Advertising on the Internet, Proceedings of the Thirtieth Hawaii International Conference on System Sciences, Jan. 1997.
Kazienko & Adamski, Personalized Web Advertising Methods, Third International Conference, AH 2004, Aug. 23-26, 2004.
Cleland, Kim, Accipiter latest entrant in race to manage ads, company sets sights on helping content providers target audience, Adage.com, Sep. 9, 1996.
Cleland, Kim, New Player joins fray of Web ad targeters, adage.com, Feb. 24, 1997.
Bayne, Kim M., AdKnowledge rolls out Web ad evaluation tool, adage.com, Jul. 8, 1999.
Langheinrich et al., Unintrusive Customization Techniques for Web Advertising, Computer Networks 31, 1259-1272, May 1999.
Maekawa et al., A Java-Based Information Browsing System in a Remote Display Environment, IEEE (2004).
Meeker, Mary, The Internet Advertising Report, Harper Business (1997).
Yeager & McGrath, Web Server Technology, The Advance Guide for World Wide Web Information Providers, Morgan Kaufmann Publishers (1996).
Net.Genesis &: Devra Hall, Build a Website, The Programmer's Guide to Creating, Building, and Maintaining a Web Presence, Prima Publishing (1995).
NetGravity Launches AdServer 3.5 with Beefed Up Targeting, clickz.com, Sep. 10, 1998.
Novak & Hoffman, New Metrics for New Media, Toward the Development of Web Measurement Standards, Project 2000, elab.vanderbilt.edu, Sep. 26, 1996.
RealMedia.com webpages, www.archive.org, archived on May 15, 19977 and Jun. 7, 1997.
Bruner, Rick E., Interactive, NetGravity to launch new ad service bureau, adage.com, Dec. 1, 1997.
Bruner, Rick E., Small networks chase per-click ad business, Aaddzz, ValueClick compete, AdvertisingAge, Sep. 8, 1997.
Zeff & Aronson, Advertising on the Internet, 1st Edition, John Wiley & Sons (1997).
Zeff & Aronson, Advertising on the Internet, 2nd Edition, John Wiley & Sons (1999).
Singh & Dalal, Web Home Pages as Advertisements, Communications of the ACM, Aug. 1999.
The ClickZ Network, Netscape Selects Real Media's Open AdStream, Jan. 13, 1998.
The ClickZ Network, Real Media Signs More Media Companies, Dec. 30, 1998.
www.Spinbox.com webpages, www.archive.org, archived beginning Nov. 11, 1998.
Bakos, The Emerging Role of Electronic Marketplaces on the Internet, Communications of the ACM, vol. 41, No. 8, Aug. 1998.

(56) References Cited

OTHER PUBLICATIONS

Kohda, Youiji & Endo, Susumu, Ubiquitous Advertising on the WWW, Merging Advertisement on the Browser, Fifth International World Wide Web Conference, May 1996.
Baseview.com webpages from www.archive.org, archived Jan. 16, 1997.
AdForce, Inc., Quick Reference Guide, Version 3.0 (1999).
AdManagerPro, Ad Entry Manual, User's Manual V.1.05, 1997.
AdManagerPro, Ad Entry Manual, User's Manual V.2.0, 1997.
AdManagerPro, Administration and Receivables Manual, Administrator's Manual Version 1.0.5, Nov. 1997.
AdManagerPro, Administration and Receivables Manual, Administrator's Manual Version 2.0, Jun. 1998.
Commercialization of the World Wide Web, The Role of Cookies, vanderbilt.edu web pages, archive.org, Feb. 1, 1997.
Crabtree et al., Adaptive Personal Agents, Personal Technologies (1998).
Dalton, Gregory, OPS, Answer to Cookies?, InformationWeek, Oct. 13, 1997.
Dunn et al., Privacy and Profiling on the Web, Submitted to W3C on Jun. 2, 1997.
firefly.com web pages, archive.org, archived 1998-2000.
Gilbert, Jennifer, CMGI's Web dealmaking hits big-time, Advertising Age, Oct. 4, 1999.
Hersley et al., Implementation of OPS Over HTTP, Submitted to W3C on Jun. 2, 1997.
Hersley et al., Proposal for an Open Profiling Standard, Submitted to W3C on Jun. 2, 1997.
Hersley et al., Standard Practices of OPS Systems, Submitted to W3C on Jun. 2, 1997.
junkbusters.com web pages, archive.org, archived Apr. 1997 through Nov. 2000.
Karpinski, Richard, ICE application to revolutionize e-commerce, Business Marketing, Mar. 1998.
matchlogic.com web pages, archive.org, Apr. 13, 2000.
Roscheisen, R. Martin, A Network-Centric Design for Relationship-Based Rights Management (Dissertation), Dec. 1997.
Kristol, D. & Montulli, L., HTTP State Management Mechanism, Internet Engineering Task Force, available at https://tools.ietf.org/html/rfc2109, Feb. 1997.
Berners-Lee, Tim, Information Management: A Proposal, CERN, available at http://www.w3.org/History/1989/proposal.html, May 1990.
Berners-Lee, Tim, Uniform Resource Locators (URL), A Syntax for the Expression of Access Information of Objects on the Network, Internet Engineering Task Force, available at http://www.w3.org/Addressing/URL/url-spec.txt, Mar. 21, 1994.
Berners-Lee, Tim, The Original HTTP as defined in 1991, W3C, available at http://www.w3.org/Protocols/HTTP/AsImplemented.html (1991).
Berners-Lee, Tim, et al., Hypertext Transfer Protocol—HTTP/1.0, Network Working Group Request for Comments: 1945, Internet Engineering Task Force, available at https://tools.ietf.org/html/rfc1945, May 1996.
Leiner, Barry M. et al., Brief History of the Internet, Internet Society, Oct. 15, 2012.
Berners-Lee, T. & Connolly, D., Hypertext Markup Language—2.0, Network Working Group Request for Comments: 1866, Internet Engineering Task Force, available at https://tools.ietf.org/html/rfc1866, Nov. 1995.
Tungate, Mark, Adland—A Global History of Advertising, 2d Ed. (2013).
Johnson, Bradley, Interactive, Planet Oasis Gives Web Sites Promotion Clout, Advertising Age, available at http://adage.com/article/news/interactive-planet-oasis-web-sites-promotion-clout/78467, Jul. 8, 1996.
Jones, Duncan, The History of Pay Per Click (PPC) Marketing, Online Marketing Bog (www.duncanjonesnz.com) available at https://www.duncanjonesnz.com/history-of-ppc-marketing, Sep. 23, 2014.
Moukheiber, Z., DoubleClick is watching you, Forbes Magazine, Nov. 4, 1996.
Fielding, R. et al., Hypertext Transfer Protocol—HTTP/1.1, Network Working Group, RFC 2068, Jan. 1997.
Glenn, A. and Millman, D., Access Management of Web-based Services, Ariel Glenn, D-Lib Magazine, Sep. 1998.
Samar, V., Single Sign-on Using Cookies for Web Applications, IEEE 8th Intl. Workshops on Enabling Technologies: Infrastructure for Collaborative Enterprises, Jun. 16-18, 1999.
Kiyomitsu, H., An E-Commerce Technology: Web Personalization on the Patron Web, Kobe University Economic Review 46 (2000).
Warkentin, M. and Bapna, R., Intelligent Agent-Based Data Mining in Electronic Markets, AMCIS 2000 Proceedings (2000).
Boncella, R., Internet Privacy—at Home and at Work, Communications of AIS, vol. 7, Article 14, Sep. 2001.
New Engage ECHO Remarketing Solution Aimed at Decreasing Customer Acquisition Costs, Improving Customer Retention, BusinessWire, Sep. 25, 2000.
Bilchev, G. and Marston, D., Personalized advertising—exploiting the distributed user profile, BT Technology Journal, vol. 21, No. 1, Jan. 2003.
Pan, Y. and Zinkhan, G.M., Netvertising characteristics, challenges and opportunities: a research agenda, Int. J. Internet Marketing and Advertising, vol. 1, No. 3, 2004.
Google Launches Self-Service Advertising Program, http://googlepress.blogspot.com/2000/10/google-launches-self-service.html, Oct. 23, 2000.
Google Introduces New Pricing For Popular Self-Service Online Advertising Program, http://googlepress.blogspot.com/2002/02/google-introduces-new-pricing-for.html, Feb. 20, 2002.
AdWords Separate Content Bidding, http://googlepress.blogspot.com/2005/11/adwords-separate-content-bidding_22.html, Nov. 22, 2005.
WashingtonPost.Newsweek Interactive Selects Revenue Science Audience SearchTM for Behavioral Targeting Services, https://www.audiencescience.com/washingtonpost-newsweek-interactive-selects-revenue-science-audience-search-for-behavioral-targeting-services/, Sep. 20, 2004.
Revenue Science Hosts Behavioral Targeting Workshop at Interactive Advertising World, https://www.audiencescience.com/revenue-science-hosts-behavioral-targeting-workshop-at-interactive-advertising-world/, Sep. 17, 2004.
Online Advertising and Privacy Survey Shows Consumers Hold Strong Preference for Targeted Advertising, https://www.audiencescience.com/online-advertising-and-privacy-survey-shows-consumers-hold-strong-preference-for-targeted-advertising/, Sep. 9, 2004.
Yahoo's Invalidity Contentions (pages related to parent patents in this family); *AlmondNet, Inc. et al. V. Yahoo! Inc.*, Civil Action No. 16-cv-1557-ILG-SMG, U.S. District Court for the Eastern District of New York; Jun. 30, 2017.
Exhibits C-1 through C-12 (as revised) of Yahoo's Invalidity Contentions; Jun. 30, 2017 and Aug. 22, 2017.
Excerpts from Webster's New World Computer Dictionary (9th ed. 2001) (definition of logon).
Robbin Zeff & Brad Aronson, Advertising on the Internet (2d ed. 1999) ("Zeff"); chapters 2 and 6.
Richard Trombly, How-to E-Business Models, Computerworld (Dec. 4, 2000), https://www.computerworld.com/article/2590061/ebusiness-models.html; pp. 1-4.
U.S. Appl. No. 17/401,078, filed Aug. 12, 2021, Dec. 31, 2007.
U.S. Appl. No. 16/925,655, filed Jul. 10, 2020, Apr. 17, 2007.
U.S. Appl. No. 17/092,651, filed Nov. 9, 2020, Jun. 13, 2013.
U.S. Appl. No. 17/390,211, filed Jul. 30, 2021, Aug. 3, 2011 (prov.).
U.S. Appl. No. 17/401,052, filed Aug. 12, 2021, Jun. 19, 2006 (prov.).
U.S. Appl. No. 17/714,965, filed Apr. 6, 2022, Apr. 17, 2007.
U.S. Appl. No. 17/092,651, filed Nov. 9, 2020, Jan. 30, 2013.
U.S. Appl. No. 17/401,052, filed Aug. 12, 2021, Jun. 16, 2006 (prov.).
U.S. Appl. No. 17/843,311, filed Jun. 17, 2022, Aug. 3, 2011 (prov.).
IPR2022-01064, May 31, 2022, Re: parent U.S. Pat. No. 9,830,615.

(56) References Cited

OTHER PUBLICATIONS

U.S. Appl. No. 17/699,297, filed Mar. 21, 2022, Aug. 28, 2020 (prov.).
U.S. Appl. No. 17/877,870, filed Jul. 29, 2022, Apr. 17, 2007.
IPR2022-01262, Jul. 15, 2022, Re: parent USP 8,671,139.
IPR2022-01259, Jul. 19, 2022, Re: parent U.S. Pat. No. 8,200,822.
IPR2022-01319, Jul. 26, 2022, Re: parent U.S. Pat. No. 8,671,139.
IPR2022-01324, Jul. 26, 2022, Re: parent U.S. Pat. No. 9,830,615.

* cited by examiner

CONDITION-BASED METHOD OF DIRECTING ELECTRONIC PROFILE-BASED ADVERTISEMENTS FOR DISPLAY IN AD SPACE IN VIDEO STREAMS

CROSS REFERENCE TO RELATED APPLICATIONS

This application is a continuation of application Ser. No. 17/097,865, filed Nov. 13, 2020, now U.S. Pat. No. 11,301, 898, which is a continuation of application Ser. No. 16/678, 196, filed Nov. 8, 2019, now U.S. Pat. No. 10,839,423, which is a continuation of application Ser. No. 16/194,203, filed Nov. 16, 2018, now U.S. Pat. No. 10,475,073, which is a continuation of application Ser. No. 15/822,974, filed Nov. 27, 2017, now U.S. Pat. No. 10,134,054, which is a continuation of application Ser. No. 15/360,762, filed Nov. 23, 2016, now U.S. Pat. No. 9,830,615, which is a continuation of application Ser. No. 14/960,237, filed Dec. 4, 2015, now U.S. Pat. No. 9,508,089, which is a continuation of application Ser. No. 14/620,502, filed Feb. 12, 2015, now U.S. Pat. No. 9,208,514 which is a continuation of application Ser. No. 14/201,494, filed Mar. 7, 2014, now U.S. Pat. No. 8,959,146, which is a continuation of application Ser. No. 13/491,454, filed Jun. 7, 2012, now U.S. Pat. No. 8,671,139, which is a continuation of application Ser. No. 12/823,709, filed Jun. 25, 2010, now U.S. Pat. No. 8,204,783, which is a continuation of application Ser. No. 11/763,286, filed Jun. 14, 2007, now U.S. Pat. No. 7,747,745, which claims the benefit of provisional application Ser. No. 60/804,937, filed Jun. 16, 2006, and provisional application Ser. No. 60/805, 119, filed Jun. 19, 2006, which are herein incorporated by reference.

FIELD OF THE INVENTION

The present invention generally relates to profile-based behavioral targeting advertisement placement methods. More specifically, the present invention relates to electronic advertisement placement based on expected profit from the placement.

BACKGROUND OF THE INVENTION

DoubleClick's "Boomerang" is a service for advertisers that places a cookie on computers of visitors to an advertiser's site for the purpose of finding those visitors on other sites where DoubleClick is the ad server ("ad" is short for advertisement). When the same visitors are found on those other sites, additional advertiser's ads are served to them by the DoubleClick ad sever or by the advertiser's ad server following a redirect from the DoubleClick ad server.

The only server that can read a cookie on a user's computer is a server operating under the same domain as the server that placed the cookie on a user's computer to begin with. In other words, a cookie placed by a server operating under one domain cannot be read by another server working under a separate domain. That is why the advertiser cannot expect to place a cookie of its own (e.g., ford.com cookie) on a visitor to its site and then later expect the DoubleClick ad server (doubleclick.com) to be able to recognize the visitor when that visitor is visiting sites where DoubleClick serves ads by reading the ford.com cookies. Only a server operating under the DoubleClick domain can read a cookie placed by a server operating under the DoubleClick domain. So, DoubleClick needs to place a doubleclick.com cookie on visitors to the ford.com site for DoubleClick to later find those visitors within other sites, i.e., where the DoubleClick ad server is used to serve ads.

For a site to have its ad served by an ASP-hosted ad server, such as the one operated by DoubleClick, the site needs to redirect visitors from the site to the DoubleClick ad server, to fetch the ad from the server. Following the redirect from the site, the visitor accesses the DoubleClick ad server. Because the DoubleClick server is operating under the DoubleClick domain, it can read the DoubleClick cookie or cookies and then recognize that it encountered the same visitor in the past. In this example, the DoubleClick ad server recognizes the visitor as someone who visited the ford.com site.

AlmondNet, Tacoda, RevenueScience, and other companies (herein "BT companies"; "BT" stands for behavioral targeting) specialize in targeting ads based on observed behavior of sites' visitors. BT companies place a cookie (or cookies) on the computers of visitors to specific sections of a publisher's website or on the computers of visitors of the publisher who conducted a specific action such as search, click content, click an ad, request information, acquire a product, etc.

The placement of cookies allows those publishers or the BT company itself to sell ads to advertisers. Those ads will be presented to the visitors when they are found later on the same site or on other sites. Such sites can be either a site where the BT company's software is used or a site where the BT company has bought media. The BT company may buy the media on behalf of itself or on behalf of the publisher, who is interested in delivering ads to its audience outside the publisher's site.

Although a BT company (AlmondNet, Tacoda, RevenueScience, etc.) acts as an agent that places cookies on the computers of publisher's visitors for the purpose of delivering targeted ads to the publisher's visitors on other sites, the publisher can work without an agent and place cookies or tags on the computers of the publisher's own visitors for the purpose of delivering ads to those visitors on other sites where the publisher buys ad space. Such a publisher, acting without an agent, is also included in the definition of a BT company.

A publisher may also be referred to as a "profile supplier" when it transfers profile information, such as behavioral information, demographic information, etc., to a BT company. Therefore, a publisher that is a BT company may also be its own profile supplier. Furthermore, although the name "BT company" implies the targeting of ads is based on collected behavioral profiles, a BT company may also collect other kinds of profile information, such as demographic information or user-provided information, and target ads to those visitors wherever found based on the collected profile information.

Another kind of a BT company is a company that has software installed on a person's computer, such as toolbar software, desktop search software, weather software, or any kind of software that is used by the computer's user. Such software also monitors the computer user's visits to different publishers' sites and media properties and collects profile information about the computer user for the purpose of delivering ads to the user within ad space of sites and media properties that the user visits based on the collected profiles.

A BT company using software installed on a user's computer does not need the cooperation of a visited media property to collect information about the visitor's visit because that software monitors whatever the user is doing on his or her computer. A BT company that has software installed on a user's computer is therefore its own profile supplier. Such software can place a cookie or another kind of tag on the user's computer. Because the software is installed on the user's computer, it can write cookies readable by any domain. That means that the BT company can place a tag or cookie of a second media property, if the BT company would like the second media property to recognize the visitor when the visitor visits that second media property site, by simply having the software place a cookie operating under the domain of the second property on the visitor's computer. The software may also report the collected profiles to a central server of the BT company.

The central server may also tag the visitor or arrange for the visitor to be tagged by operators of other media properties. A BT company can place a cookie on a site's section when a visitor's computer visits that section, if a code of the company was integrated into the page of that section by the site that owns the page. The code (e.g., HTML or Java) redirects to the BT company's server all visitors to the page. Also, in the case that the BT company is the publisher itself, the publisher will simply "cookie" (by itself) all visitors that either read a specific content, search, click, ask for information, make a phone call, etc.

The BT company's server, which either gave the site a unique code for a page, received from the page its URL, or received access to the page's content that could be analyzed by the BT company's server, etc., identifies the content read by the page's visitor or the keyword searched for by the user, or an ad clicked on the page, etc. The content read by the page visitor could be identified by the BT company's server whether the content was reported by the site or whether the content was identified following the analysis of the page. The server then places a cookie on the user's computer indicating what content was read by the visitor on the page, what keyword was searched for by the user, or what ad was clicked on the page, etc. The placed cookie indicates that information (1) in the cookie per se, (2) in a central database operated by the server where the cookie ID is used as a record finder, or (3) both in the cookie and in the database.

Although the above description relates to cookies, a cookie is only one example of a possible tag. A tag generally is a unique identifier used to mark a person electronically visiting a media property, such as a web site, TV channel, radio show, or the like, using a computer, a mobile device, a TV set, a TV set top box, or any other device.

The tag is used for the purpose of delivering additional ads to a visitor to one media property when that visitor is found later on other media properties, based on the visitor's profile collected on the first media property. The profile could be the observed behavior of the visitor on the media property, demographic information collected on the media property, profile information provided by the visitor to the media property, etc.

Because the purpose of the tag is to enable the delivery of additional ads on other media properties visited by the visitor, and because the delivery of an ad requires only control of the ad space and not necessarily control of the entire media property visited by the visitor, a media property (in the present context) can also be defined as any equipment that controls an ad space viewed by a visitor, including a web site, an ad network's site (where the ad network represents the ad space of different sites), a TV program, some of the ad space within TV programs or TV channels (represented by a cable company), a TV network, or any ad space for which an entity is allowed to sell an advertisement and deliver it within the ad space; whether the ad space is owned by that entity, or whether the entity pays the owner of the ad space when using its ad space to deliver an ad sold by the entity. Ad space can be on a web site, in a TV program, in a text message, in a radio show, in any broadcasted material, in any streaming video or audio, etc. An ad space can be a fixed position on a page, or the ad space can be made available by a web site to an ad network (for example) only when the web site did not sell all of the site's ad inventory and therefore wishes to make some of the inventory available to the ad network.

In the case of a media property controlling an ad space viewed by a visitor, a specific ad space on a page might be controlled only temporarily. For example, in the case of the web site that did not sell all the ad impressions available to be delivered within an ad space on a page and therefore makes the unsold ad space available to the ad network to fill, the ad network will have temporary control of the ad space, i.e., when that ad space is given to it by the web site. Once the site redirects the ad space on the page to the ad network (so the ad network could fill the ad space with an ad sold by the ad network), the ad network controls the ad space and has access to the visitor viewing the ad space that was redirected to the ad network by the site, and therefore the ad network's equipment is considered a media property, as it controls an ad space viewed by a visitor.

The tag can be placed on the device used by the user to access the first media property where the user's profile was collected (in case of observed behavior, that behavior can be reading a specific content, searching, clicking an ad or content, making a phone call, asking for product information, acquiring a product, or taking any other kind of action). A tag placed on the device (1) could be read only by a server operating under the same domain as the server that placed the tag on the device to begin with as in the case of a cookie for example, (2) could be placed on the device when the user visited the first media property, and then the tag can be read by any second media property visited by the visitor, or (3) could be encrypted and, while accessed by any second media property visited by the visitor, the tag could be deciphered only by second media property computers that received the deciphering code from the first media property. In case of a tag placed by software installed on a user's computer, the tag could be whatever the software wants it to be, including a cookie of any domain.

A tag does not have to be placed on the user's device. A tag can also be used in a central database of a BT company or a central database of any second media property visited by the visitor, where the tag could be a unique identifier either of the device or of the user. In the case where the tag identifies the device, the tag might denote an IP address, a phone number, a device's manufacturer serial number, etc. A cookie placed on the device can also uniquely identify the device and the cookie therefore can be used as a tag in a central database. In the case where the tag identifies the user, the tag might denote the username and password used to access a media property, a user's name and address, a user's e-mail, a user's social security number, or any other personal identifiable information.

As already mentioned, the observed behavior of a visitor to a first media property is referred to as profile information about a specific visitor. A visitor's profile might be enhanced by the visitors' observed behavior on other media properties or by other profile information collected on other media properties.

A visitor's profile can be represented by a unique tag, or the profile can be stored with the tag, whether the tag is placed on the device, on a central database, or both. For example, the profile can be stored within a cookie (tag) on a visitor's device, or the profile can be stored in a central database where the tag connected to the profile is used as a unique identifier of the visitor's device or of the visitor personally. The profile can also be saved on both the device and a central database.

One of the major challenges in targeting a first site visitor on another site with an ad based on his observed behavior on sites visited by him previously (such as the first site) is actually finding the visitor on other sites.

Depending on the tag placed (or arranged to be placed) by the BT companies, the visitor could be recognized either by the entity that placed the tag to begin with (which requires access by that entity to the tag when the visitor visits a second media property) or by the second media property reading the tag (in which case the tag can be placed by the second media property if the BT company so arranges).

BT companies, acting as an agent, can find visitors tagged by them, when the tagged visitors are present on sites that use the BT companies' software (either to serve ads or in conjunction with those sites' ad servers). BT companies (whether it is acting as an agent, is the publisher itself, or is operating with any other BT company) can find visitors tagged by them, when the visitors are present on sites and ad networks where the BT companies buy media.

To make the process of finding people who visited a first media property on other media properties more efficient, BT companies enable sites and ad networks (from whom the BT companies buy media) to also place their cookies on the computers of people (visitors) on whose computers the BT company has placed its own cookie. That technique is similar to the way DoubleClick's Boomerang system places cookies on visitors to an advertiser site for the purpose of finding those visitors later on other sites where Doubleclick serves ads.

An ad network ad server (or any other server of the ad network) or a site's ad server (or any other server of the site) can place their own cookies on the computers of visitors that are redirected to them by the BT companies, for the purpose of later recognizing those visitors within their own ad space (i.e., the ad space of the ad networks or the sites).

This process—where sites and ad networks place cookies on visitors' computers redirected to them by BT companies (or other entities interested in additional ads presented to their audience elsewhere)—is sometimes referred to as "cookie matching."

For example, weather.com might place a weather.com cookie on a user's computer marking him or her as a visitor to BT company #1, following a redirect from BT company #1 server. Later, if and when the weather.com ad server recognizes that the same visitor (previously redirected to him by BT company #1) happened to visit weather.com (weather.com will recognize the visitor by reading its own weather.com cookie, which marked the visitor as a BT company #1 visitor), the weather.com ad server can, if it wishes, redirect the visitor's computer to the BT company #1 server, to have an ad served to the visitor, either by BT company #1's ad server or another ad server to which BT company #1 ad server further redirects the visitor. The weather.com ad server's decision, whether or not to redirect the visitor's computer to BT company #1's server can be based on the price that BT company #1 promised to pay weather.com for the presentation of an ad within weather.com's ad space, to a visitor previously redirected to weather.com by BT company #1's server.

Although the above-described processes enable a second media property to recognize a first media property visitor, it is still a very inefficient process for the following reasons:

(1) Media properties' ad space prices vary.

(2) Profiles of media properties' visitors are worth different amounts to advertisers depending on the profiles. For example, a person who searched for a "mortgage" on a search engine might be presented with a mortgage-related ad, for which the advertiser is willing to pay $3 if that person clicks on that ad. A person who searched for "socks" on a search engine might be presented with a socks-related ad, for which the advertiser is willing to pay $0.50 if that person clicks on that ad. A person who visited the mutual fund section of a site might be presented with a mutual-fund related ad (wherever the person is found, i.e., either on the same site or on other sites), in which case the advertiser is willing to pay $25 for every thousand ads (CPM) presented to people who visited that mutual fund section.

(3) The same person might have several profile attributes in his or her profile (as a result, for example, of that person conducting several different searches and visiting different sites). Different advertisers might be willing to pay different amounts for delivering ads to the person based on the specific profile attribute or attributes that the respective advertisers are looking to target.

In summary, the cost of ad space at a second media property might not be covered by revenues generated for a BT company buying the space, i.e., from an ad delivered within the second media property ad space based on a profile collected in a first media property or properties. Alternatively, the revenues might cover the media cost but not deliver satisfactory margins to the BT company, when taking into account other costs, such as ad sales people cost, ad serving cost etc.

SUMMARY OF THE INVENTION

According to various aspects of the invention, therefore, an automatic system is described to facilitate selection of media properties on which to display an advertisement, responsive to a profile collected on a first media property, where a BT company calculates expected profit for an ad correlated with the profile and arranges for the visitor to be tagged with a tag readable by the selected media property.

The profit can be calculated by deducting, from the revenues that are expected to be generated from an ad delivered based on the collected profile, at least the price of ad space at a media property where the BT company might like to deliver ads to the profiled visitor. When the calculated profit is positive (i.e., not a loss), the BT company arranges for the visitor to be tagged with a tag readable by the selected media property through which the BT company expects to profit.

The above summary does not include an exhaustive list of all aspects of the present invention, Indeed, the inventor contemplates that the invention may include all systems and methods that can be practices from all suitable combinations of the various aspects summarized above, as well as those disclosed in the detailed description below and particularly pointed out in the claims filed with the application. Such combinations have particular advantages not specifically recited in the above summary.

DESCRIPTION OF PREFERRED EXEMPLARY EMBODIMENTS

Figure 1:
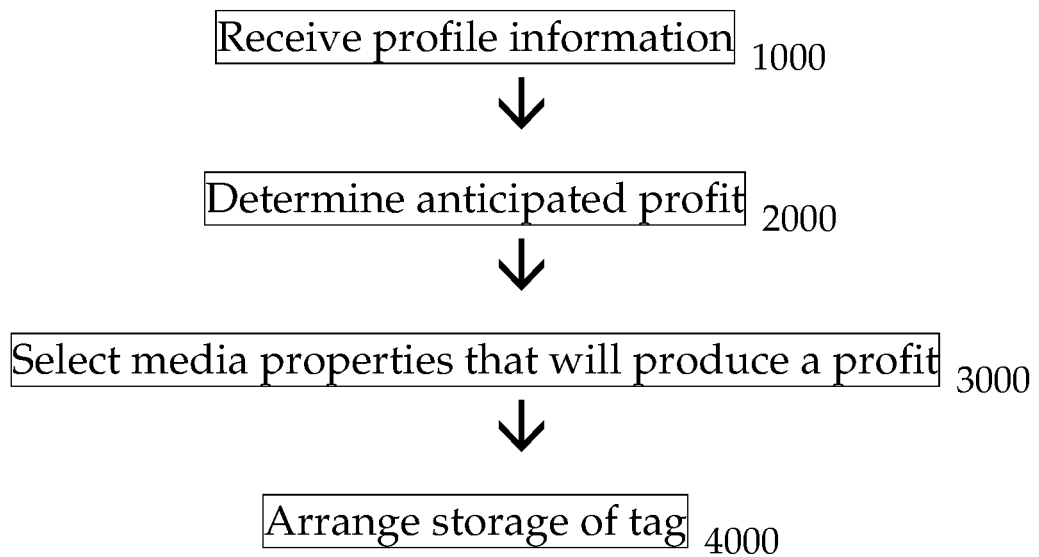
FIG. 1 is a flow diagram of an exemplary embodiment of a profit-based selection method.

Referring to the embodiment of FIG. 1, responsive to receiving (1000) profile information (e.g., actions) of an electronic visitor with respect to a first media property, the instant method includes (i) determining (2000) anticipated revenues and/or profit resulting from placing an advertisement targeted to the visitor based on the received profile, and (ii) automatically selecting (3000) at least one media property for which it is anticipated that there will be a positive profit in delivering an ad to the profiled visitor. The method includes, via an electronic communications media, for each of the selected media properties, arranging (4000) for electronic storage of a tag readable by said media property, wherein the tag is associated with the visitor.

Profit can be defined as:

(1) revenues expected to be generated, from an ad delivered based on the collected profile, minus the ad space cost at a specific media property (i.e., Pr=Rev (profile)−P (mp), where "Pr" is profit, "Rev" is revenue generated from advertising to a visitor with a particular profile, and "P" is the price charged by media property "mp" for advertising in an ad space);

(2) revenues expected to be generated, from an ad delivered based on the collected profile, minus the sum of (a) the price for buying ad space on the specific media property, (b) ad serving cost, (c) ad sales associated cost, and (d) desired profit margin (i.e., Pr=Rev(profile)−P(mp)−C−Mar, where "C" represents costs and "Mar" represents desired profit margin), or (3) in other ways.

If the calculated profit indicates that the BT company will lose (negative profit) from delivering an ad, based on the received profile on any of the possible media properties where it is buying ad space, the BT company won't arrange for the visitor to be tagged by a tag readable by any of those media properties, and the BT company might even decide not to collect the profile (so the visitor's profile will not be stored). Using the equation defining profit in item (2) just above, the question of whether the profit is positive or negative, as stated in this paragraph, equates to testing (4) whether Rev(profile)−P(mp)−C−Mar>0, which is the same as (5) whether Rev(profile)−P(mp)−C>Mar, or (6) whether Rev(profile)>P(mp)+C+Mar, or (7) whether P(mp)<Rev(profile)−C−Mar. Grouping the terms on the right-hand side of the equation in item (7) reduces that equation to the same as testing whether the price charged by a media property is less than a price cap, with the price cap being defined as the difference determined by subtracting from the revenue generated from advertising to a visitor with a particular profile a selected amount, here defined by the costs and desired profit margin.

Likewise, using the equation defining profit in item (1) just above, the question of whether the profit is positive or negative equates to testing (8) whether Rev(profile)−P(mp)>0, which equates to testing (9) whether P(mp)<Rev(profile), which again is the same as testing whether the price charged by a media property is less than a price cap, with the price cap being defined in this instance simply as the available revenue generated from advertising to a visitor with a particular profile.

Figure 2:
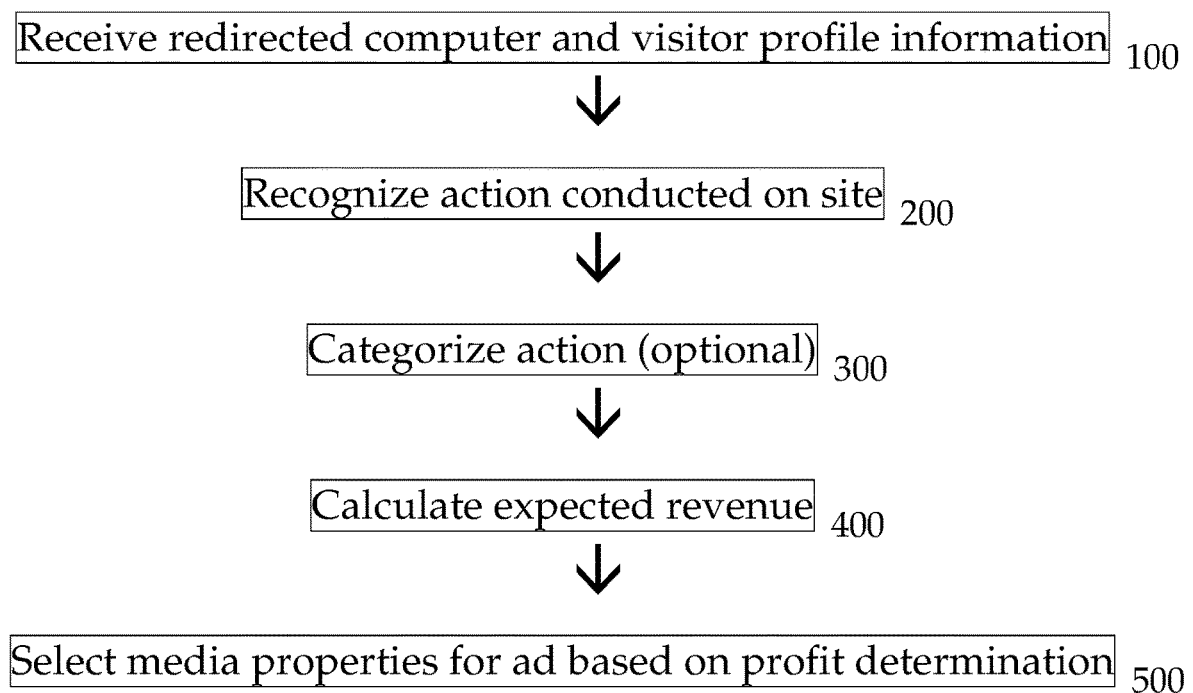
FIG. 2 is a flow diagram of an exemplary embodiment of a profit-based selection method.
Figure 3:
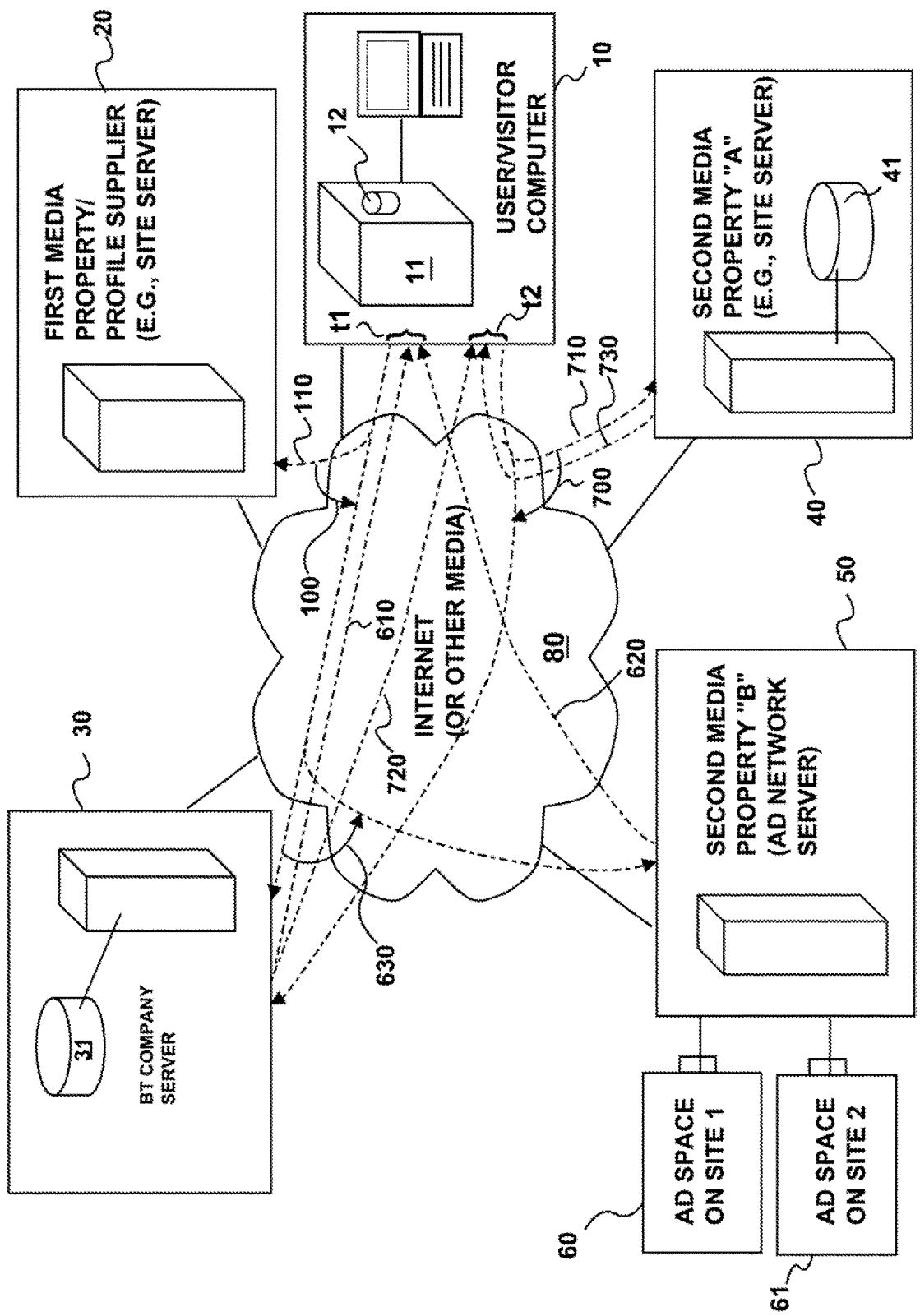
FIG. 3 is a schematic of an exemplary embodiment of entities and associated equipment used with a profit-based selection method.

The method includes the following basic steps, shown in FIGS. 2 and 3:

1. A profile supplier 20 redirects (100) a visitor 10 to a BT company 30 along with the visitor's profile. In case the profile supplier 20 is also the BT company 30, this step either does not take place or takes place internally, for example via an internal redirect from one server to another server operating under the same domain that belongs to the publisher/BT Company. In case the BT company 30 has software on a user's computer 11 that enables it to monitor the user's visits to media properties (e.g., 20, 40, 50) without the cooperation of the media properties, this step either does not take place or takes place internally, e.g., by the software on the user's computer communicating the collected profile to the BT company's central server.

2. The BT company 30 recognizes (200) the content read by the user 10, the category to which the content read by the user 10 belongs, the keyword searched for by the user 10, an ad clicked by the user 10, or any other action conducted on the page/site 20 by the user 10 (such as click on an item of content or an ad, purchase of a product, request for more information, etc.) during the site visit (110). The recognizing might be as simple as pulling a keyword for which the visitor 10 searched from a URL used by the profile supplier 20 to redirect the visitor 10 to the BT company 30, for example.

3. The BT company 30 optionally can categorize (300) specific content read by the user 10, or an action conducted by a user 10. An example action might be a search for a keyword. To illustrate, suppose a person searched for an airline ticket to Florida on a travel site. When the BT company 30 receives that information, in addition to recording the search for the flight to Florida in the visitor's profile (whether the profile is stored in the cookie or tag, the BT company's central database 31, or both of those places), the BT company 30 may further categorize the person under the "Travel" category and in the "Search for Flights" subcategory of "Travel."

4. The BT company 30 calculates (400) expected revenues from delivering ads based on the collected profile (Rev(profile) in the equations above). The revenues are calculated based on the kind of collected profile: (a) Expected revenues from content read by the visitor 10 can be calculated by checking, for example, how much advertisers are willing to pay for delivering ads to visitors who read specific content. (b) Expected revenues from delivering ads based on a keyword searched by the visitor 10 can be calculated by checking, for example, how much advertisers are willing to pay for each click on an ad related to the keyword for which the visitor searched and multiplying that price per click by an assumed click-through rate on ads related to the searched-for keyword, up to 14 days after the visitor's search. In general, expected revenues can be calculated for the delivery of ads based on a category of content read by the visitor 10, for specific content read by the visitor 10, or for action taken by the visitor 10 (e.g., made a phone call, clicked an ad, clicked specific content, asked for information, acquired product, etc.).

5. The BT company 30 selects (500) media properties (e.g., 40) for the delivery of an advertisement based on a profile collected on a first media property 20. The BT company 30 makes the selection based on a calculated expected profit and then arranges for the visitor 10 to be tagged (610 or 620) with a tag readable by the selected media property 40. The profit is calculated in any of the alternative manners stated above.

The BT company's arranging placement of the tag can be achieved in different ways:

A. The BT company 30 can redirect (630) a visitor to the selected media property 40, 50 with a request to have the selected media property 40, 50 tag (620) the visitor with the media property's own tag, which obviously is readable by the selected media property 40, 50 (such a tag could be a cookie on the visitor's storage device 12).

S. The BT company 30 can itself place (610) a tag that will be readable by the selected media property 40.

C. The BT company 30 can place an encoded tag that, although accessible by any media property (e.g., 40, 50), can be read only by a selected media property 40 to which the BT company gave a deciphering code.

D. In cases when the BT company 30 has software installed on a user's computer 10, the BT company 30 can arrange for the software to place (not shown) a tag readable by the selected media property 40 (such a tag could be a cookie operating under the selected media property domain).

E. The BT company 30 can arrange for the selected media property 40 to place a tag in the selected media property's central database 41, in which case the tag can uniquely identify (1) the device 11 that the visitor 10 will use to access the selected media (IP address, set-top box ID, mobile phone number, manufacturer serial number, cookie readable by the selected media property, etc.), or (2) the user as a person (personal identifiable information).

When a selected media property 40 recognizes a tagged visitor 10 (tagged previously, at time t1) later (at time t2) visiting (710) its ad space, the media property 40 will arrange for the BT company 30 to serve an ad (720) to the visitor 10 (which will appear with the media content (730) requested by the visitor), by redirecting (700) a visitor to the BT company 30, for example.

The media properties can be of the same kind of media (e.g., two web sites 40, 60 on the Internet 80) or of different media (e.g., first media property can be a web site 40 on the Internet 80, and the second media property can be a TV channel on TV or a text message system on a mobile phone, etc.). In the case (not shown) where the second media property operates within a different media than the first media, the tagging of the visitor with a tag readable by the second media property (which is arranged by the BT company 30) might include finding the device used by the visitor 10 to access the second media by using personal identifiable information about the visitor 10. As there may be no connection between the device used by the visitor to access the first media property (computer 11, for example) and the device used by the visitor to access the second media property (TV, for example) besides the commonality of the user (visitor) 10, personal identifiable information about the visitor 10 could be used to allow the second media property to learn which device the visitor 10 uses to access the second media property and tag the visitor 10. The second media property could tag the device used by the visitor 10 to access the second media property (by placing a tag on the device itself or in a central database of the second media property, for example).

Although the BT company 30 stores the visitor's collected profile, in the above-described implementation it does not transfer the collected profile to the second media property 40, 50 but simply asks the second media property 40, 50 to tag the visitor as a BT company visitor or arrange for a tag to be placed (620) that is readable by the second media property 40 and that marks the visitor as a BT company visitor. As the BT company 30 buys ad space from the proprietor of the second media property 40 and delivers therein an ad based on the collected profile, the BT company 30 has no economic incentive to transfer the profile information itself (such as the fact that the visitor searched for "car insurance") to the second media property 40. The second media company's proprietor is being paid for the ad space and therefore just needs to know that the visitor 10 has been profiled by the BT company 30, which will pay the second media property's proprietor for an opportunity to deliver an ad to this visitor 10 within the ad space of the second media property 40.

Suppose, for example, a person searches for "mortgage" on Google (Google is a BT company 30 in this example). Using the method above, Google calculates that advertisers are willing to pay $3 per click on a mortgage-related ad, that the expected click-through on a mortgage-related ad is 0.3%, and therefore Google will earn $9 for every thousand mortgage-related ads delivered to people that searched for "mortgage" on Google when those people are found later, anywhere on the web (i.e., this is "Rev(profile)"). Google further knows that it costs Google $3 CPM to deliver a thousand ads on weather.com (i.e., "P(mp)") to computers that were tagged by weather.com as Google visitors. Google therefore can calculate a profit of $6 CPM (without taking into account other costs, i.e., "C") for delivering a thousand mortgage-related ads to Google visitors who searched for "mortgage" on Google when found later within the ad space of weather.com. Google will therefore arrange for weather.com to tag the person who searched for "mortgage" on Google as a Google visitor (by redirecting the visitor to weather.com with the request to tag the person as a Google visitor, for example).

In the case where a second media property controls ad space with prices that fall within a range, the BT company 30—in addition to arranging for the second media property (e.g., 50) to tag (620) its visitor—may also provide the second media property 50 with the price the BT company 30 is willing to pay the second media property 50 for delivering an ad within the second media property's ad space. In FIG. 3, second media property 50 is shown as an ad network's site (where the ad network represents the ad space of different sites, 60, 61), as described above. The price delivered from the BT company 30 enables the second media property 50 to determine which ad space it should allocate to the BT company 30 when the tagged visitor 10 visits the second media property 50. Although some of the ad space (e.g., on site 60) might be too expensive, i.e., above the cap defined by the price the BT company 30 is willing to pay, other ad space (e.g., on site 61) might have a cost that would be covered by the price the BT company 30 is willing to pay. However, obviously, the BT company 30 will not arrange for tag placement if the price it is willing to pay for delivering an ad to the profiled visitor 10 is less than the lowest price demanded by a second media property 50 for delivering an ad within that ad space, i.e., price cap<min[P(mp)].

Given that some kind of profiles such as behavioral profiles are time-sensitive (in other words, their value diminishes with time), the BT company 30—in addition to arranging the placement of a tag readable by the second media property 40, 50—may also provide the second media property 40, 50 (via the tag, for example) with a time period within which the BT company 30 will agree to deliver ads to the profiled visitor 10 within the ad space of the second media property 40, 50. Suppose, for example, a BT company 30 collected a profile of a visitor 10 who searched for "flowers." The BT company 30 might arrange for the visitor 10 to be tagged with a tag, readable by a second media property 40, marking the visitor 10 as the BT company's visitor and setting a time limit of two days, which means that the second media property 40 can call upon the BT company 30 to serve an ad to the tagged visitor 10 only when the visitor 10 is found within the second media property's ad space up to two days after the visitor 10 was tagged (the tag may have a time stamp identifying the date and time the tag was placed to help the second media property 40 calculate the date before which the second media property 40 can call upon the BT company 30 to serve an ad).

The calculation that takes place in steps 4 and 5 of the above-described method may take place not at the time of profile collection as described above but beforehand. Conducting the calculation before the profile is collected can shorten the time it takes the server 30 to select the media properties. The calculation might be done beforehand for other reasons.

Specifically, step 4 (which states that the BT company 30 calculates the expected revenues from delivering ads based on the collected profile, where the revenues are calculated based on the kind of collected profile, i.e., "Rev(profile)") may take place in advance. If for example, a collected profile describes the content read by a visitor, then, if other profiles were previously collected of the same kind of profile, there is no need to check how much advertisers are willing to pay for delivering ads, as it was already checked for profiles of the same kind.

The word "calculating" expected revenues can encompass a scenario in which there are no arithmetic calculations, but rather simply an act of locating the correct information. In this example, the information concerning how much advertisers are willing to pay for delivering their ads to visitors 10 that read a specific content is located, and no arithmetic calculation is needed.

For another example, if the expected revenues for delivering an ad for someone who searched for "mortgage" has recently been calculated, then there is no need to calculate it again, and the information can simply be located.

Although the examples describe calculation of revenues from delivering an ad at a media property 40, 50, depending on the method of payment for the media property, different calculations of expected revenues can take place.

If the media property only gets paid for when a visitor visiting it takes action, then the revenues per profile-based ad delivery should also be based on an action. Such a visitor action can be a click on an ad, a request for information from the advertiser (following a click on the ad), a registration with the advertiser, an act of buying a product or service from the advertiser, etc.

For example, if the media property 40 is paid at the rate of $0.40 per click on an ad presented to the media property's visitor, the BT company 30 will check how much the advertiser will pay the BT company 30 per visitor click when viewing an ad based on the collected profile. If the price per click paid by the advertiser at least exceeds the price per click paid for the media property, then the BT company 30 can arrange for the tagging of the visitor 10 with a tag readable by the selected media property (the one that will cost $0.40 per click).

In some scenarios, the BT company 30 might be paid for every ad delivered to a visitor, but the media property might trigger payment for every visitor click on an ad. Conversely, the BT company 30 might be paid for a visitor click on an ad, but the media property might trigger payment for every delivered ad regardless of whether a click took place or not. In those scenarios, so as not to expose itself to the risk of loss, the BT company 30 preferably translates the payment it receives (whether per ad delivery or ad click or per action) to the payment method applied to the media property. For example, if the BT company 30 is paid $0.25 per click on an ad by a visitor who searched for a "DVD" but a media property triggers payment for every ad delivery at $0.50 CPM (regardless of whether a click took place), the BT company 30 can translate the payment per click it receives to payment for ad delivery. In this example, the BT company 30 can calculate that, with an expected click-through of 0.4% on DVD-related ads by people who searched for "DVD" up to seven days before they are presented with an ad, the BT company 30 will generate $1 CPM (0.4% CTR*1,000 ads*$0.25 per click=$1), i.e., Rev(profile)≈$1 CPM. Because $1 CPM is more than the $0.50 cost of the media property (i.e., Rev(profile)>P(mp)), the BT company 30 will make a gross profit of $0.50 CPM and therefore (assuming costs are low or ignored) arrange for tag placement.

Likewise with respect to step 5 (which states that the BT company 30 selects media properties for delivery of an advertisement based on a profile collected on a first media property where the selection is made by the BT company 30 based on a calculated expected profit), the calculation on which the media property selection is based could be a calculation done beforehand. If the collected profile is of the same kind as another profile that was collected recently (for example, both profiles describe "searching for flights") then the information concerning how much revenues would be generated from such a profile is already available, and there is no need to recalculate. Also, the profit has also been calculated, because the cost of ad space at the different media properties probably does not change in a short period of time. A look-up table can be used that lists, based on the kind of profile, the media properties that should be selected. In such a scenario, the steps of the method will be:

1. The BT company 30 calculates expected revenues from delivering ads based on different collected profiles.

2. The BT company 30 calculates expected profits (or losses) for the delivery of ads based on different collected profiles within the ad space of different available media properties 40, 50.

3. The BT company 30 builds a table wherein each kind of profile is assigned media properties where ads will be delivered based on the profile, and wherein the selection of media properties is made based on the previously calculated profit. The table is updated on a regular basis to make sure it is up to date.

4. The BT company 30 collects a profile.

5. The BT company 30 arranges for placement of a tag readable by a selected media property, where the selected media properties are taken from the table described in step 3 above.

The above is just one possible implementation. Instead of a table, a database or any other data structure can be used. The calculation could be done entirely in advance, entirely when the profile is collected, or a combination wherein some of the calculation is done in advance and some when the profile is collected.

Accordingly, the method can be described in the following more general steps:

1. The BT company 30 collects a profile.

2. The BT company 30 arranges (610, 620) for a tag (readable by a selected media property 40, 50, or both) to be placed, where the media property is selected based on the expected profit from the delivery of an ad (720) based on the collected profile within the ad space of the media property.

Although the above method focuses on profit calculation that takes into account expected revenues from delivery of an ad based on a collected profile, media property ad space cost and other costs, other parameters beyond costs and revenues might be taken into account. For example, an advertiser might insist that its ads appear on media properties that have certain content and not on other media properties, a media property might not agree to show ads from a certain category (for example, a sports media property might not agree to show sports-related ads, to avoid promoting competitors), etc.

PUBLIC NOTICE REGARDING THE SCOPE OF THE INVENTION AND CLAIMS

The inventor considers various elements of the aspects and methods recited in the claims filed with the application as advantageous, perhaps even critical to certain implementations of the invention. However, the inventor regards no particular element as being "essential," except as set forth expressly in any particular claim.

Although the invention has been described in terms of preferred embodiments and generally associated methods, the inventor contemplates that alterations and permutations of the preferred embodiments and methods will become apparent to those skilled in the art upon a reading of the specification and a study of the drawings.

I claim:

1. A method of causing direction of electronic advertisements, performed by a first computer system comprised of one or more computers, which first computer system is controlled by a first entity, the method comprising:
automatically with the first computer system:
(a) recording, in a first profile associated with a first computerized device, which first profile is maintained by the first computer system, behavioral profile information collected by software on the first computerized device relating to actions performed by a user using the first computerized device;
(b) using personally identifiable information about the user to identify a second computerized device of the user;
(c) at a first time, causing a second computer system not controlled by the first entity, which second computer system controls advertising space in a plurality of video streams, which advertising space is not controlled by the first entity at the first time, to electronically have access to tag information, without transferring to the second computer system any of the behavioral profile information in the first profile collected by the software, which tag information denotes to the second computer system that the first entity has profile information about the user of the second computerized device;
(d) electronically transferring to the second computer system a condition specific to the first profile for allowing delivery of an advertisement; and
(e) at a second time, later than the first time, while the second computerized device is being used to display one of the plurality of video streams, following the second computer system checking the condition and determining that the condition is met, causing a selected advertisement to be served in the one of the plurality of video streams, which advertisement is based on the profile information collected by the software, which profile information is in the first profile that is associated with the first computerized device and maintained by the first computer system.

2. The method of claim 1 wherein the first profile is one of a plurality of profiles stored in a central database of the first computer system.

3. The method of claim 1 wherein the act in part (e) of causing a selected advertisement to be served in the one of the plurality of video streams comprises selecting the selected advertisement with the first computer system.

4. The method of claim 1 further comprising, automatically with the first computer system, at the first time, selecting the second computer system from among a plurality of computer systems controlled by different entities.

5. The method of claim 1 wherein the second computer system is an ad network that has control of ad space of a plurality of entities, including temporary control of ad space in the one of the plurality of video streams.

6. The method of claim 1 further comprising automatically with the first computer system categorizing the action performed using the first computerized device.

7. The method of claim 6 wherein the first profile is one of a plurality of profiles stored in a central database of the first computer system.

8. The method of claim 7 wherein the act in part (e) of causing a selected advertisement to be served in the one of the plurality of video streams comprises selecting the selected advertisement with the first computer system.

9. The method of claim 1 wherein the tag information includes personally identifiable information identifying the user.

10. The method of claim 1 wherein causing a second computer system to electronically have access to tag information comprises enabling the second computer system to place a cookie of the second computer system, which cookie identifies the second computerized device.

11. The method of claim 10 (i) wherein the second computer system is an ad network that has control of ad space of a plurality of entities, including temporary control of ad space in the one of the plurality of video streams, and (ii) further comprising automatically with the first computer system categorizing the action performed using the first computerized device.

12. The method of claim 11 wherein the act in part (e) of causing a selected advertisement to be served in the one of the plurality of video streams comprises selecting the selected advertisement with the first computer system.

13. A computer system comprised of one or more computers, which computer system is a first computer system controlled by a first entity and is programmed and connected to automatically:
(a) record, in a first profile associated with a first computerized device, which first profile is maintained by the first computer system, behavioral profile information collected by software on the first computerized device relating to actions performed by a user using the first computerized device;
(b) use personally identifiable information about the user to identify a second computerized device of the user;
(c) at a first time, cause a second computer system not controlled by the first entity, which second computer system controls advertising space in a plurality of video streams, which advertising space is not controlled by the first entity at the first time, to electronically have access to tag information, without transferring to the second computer system any of the behavioral profile information in the first profile collected by the software, which tag information denotes to the second computer system that the first entity has profile information about the user of the second computerized device;
(d) electronically transfer to the second computer system a condition specific to the first profile for allowing delivery of an advertisement; and
(e) at a second time, later than the first time, while the second computerized device is being used to display one of the plurality of video streams, following the second computer system checking the condition and determining that the condition is met, cause a selected advertisement to be served in the one of the plurality of video streams, which advertisement is based on the profile information collected by the software, which profile information is in the first profile that is associated with the first computerized device and maintained by the first computer system.

14. The computer system of claim 13 wherein the first profile is one of a plurality of profiles stored in a central database of the first computer system.

15. The computer system of claim 13 wherein the first computer system is further programmed and connected to automatically select the selected advertisement.

16. The computer system of claim 13 wherein the first computer system is further programmed and connected to automatically, at the first time, select the second computer system from among a plurality of computer systems controlled by different entities.

17. The computer system of claim 13 wherein the second computer system is an ad network that has control of ad space of a plurality of entities, including temporary control of ad space in the one of the plurality of video streams.

18. The computer system of claim 13 wherein the first computer system is further programmed and connected to automatically categorize the action performed using the first computerized device.

19. The computer system of claim 18 wherein the first profile is one of a plurality of profiles stored in a central database of the first computer system.

20. The computer system of claim 19 wherein first computer system is further programmed and connected to automatically select the selected advertisement.

21. The computer system of claim 13 wherein the tag information includes personally identifiable information identifying the user.

22. The computer system of claim 13 wherein the first computer system being programmed and connected to cause the second computer system to electronically have access to tag information comprises the first computer system being programmed and connected to enable the second computer system to place a cookie of the second computer system, which cookie identifies the second computerized device.

23. The computer system of claim 22 (i) wherein the second computer system is an ad network that has control of ad space of a plurality of entities, including temporary control of ad space in the one of the plurality of video streams, and (ii) wherein the first computer system is further programmed and connected to automatically categorize the action performed using the first computerized device.

24. The computer system of claim 23 wherein the first computer system is further programmed and connected to automatically select the selected advertisement.

25. An article comprising a tangible medium that is not a transitory propagating signal having computer-readable instructions embodied thereon, which, when applied to a computer system comprised of one or more computers, which computer system is a first computer system controlled by a first entity, instruct the first computer system to automatically perform a method of causing direction of electronic advertisements, the method comprising:

automatically with the first computer system:

(a) recording, in a first profile associated with a first computerized device, which first profile is maintained by the first computer system, behavioral profile information collected by software on the first computerized device relating to actions performed by a user using the first computerized device;

(b) using personally identifiable information about the user to identify a second computerized device of the user;

(c) at a first time, causing a second computer system not controlled by the first entity, which second computer system controls advertising space in a plurality of video streams, which advertising space is not controlled by the first entity at the first time, to electronically have access to tag information, without transferring to the second computer system any of the behavioral profile information in the first profile collected by the software, which tag information denotes to the second computer system that the first entity has profile information about the user of the second computerized device;

(d) electronically transferring to the second computer system a condition specific to the first profile for allowing delivery of an advertisement; and (e) at a second time, later than the first time, while the second computerized device is being used to display one of the plurality of video streams, following the second computer system checking the condition and determining that the condition is met, causing a selected advertisement to be served in the one of the plurality of video streams, which advertisement is based on the profile information collected by the software, which profile information is in the first profile that is associated with the first computerized device and maintained by the first computer system.

26. The article of claim 25 wherein the first profile is one of a plurality of profiles stored in a central database of the first computer system.

27. The article of claim 25 wherein the instructions further cause the first computer system to select the selected advertisement.

28. The article of claim 25 wherein the instructions further cause the first computer system to, at the first time, select the second computer system from among a plurality of computer systems controlled by different entities.

29. The article of claim 25 wherein the second computer system is an ad network that has control of ad space of a plurality of entities, including temporary control of ad space in the one of the plurality of video streams.

30. The article of claim 25 wherein the instructions further cause the first computer system to categorize the action performed using the first computerized device.

31. The article of claim 30 wherein the first profile is one of a plurality of profiles stored in a central database of the first computer system.

32. The article of claim 31 wherein the instructions further cause the first computer system to select the selected advertisement.

33. The article of claim 25 wherein the tag information includes personally identifiable information identifying the user.

34. The article of claim 25 wherein the instructions further cause the first computer system to causing the second computer system to electronically have access to tag information by enabling the second computer system to place a cookie of the second computer system, which cookie identifies the second computerized device.

35. The article of claim 34 (i) wherein the second computer system is an ad network that has control of ad space of a plurality of entities, including temporary control of ad space in the one of the plurality of video streams, and (ii)

wherein the instructions further cause the first computer system to categorize the action performed using the first computerized device.

36. The article of claim 35 wherein the instructions further cause the first computer system to select the selected advertisement.

* * * * *